May 27, 1958  M. E. BARNES  2,836,322

DEVICE FOR CATCHING RIVET HEADS

Filed Dec. 14, 1956

INVENTOR.
MARCUS E. BARNES
BY
Donald G. Dalton
HIS ATTORNEY

United States Patent Office 2,836,322
Patented May 27, 1958

2,836,322

DEVICE FOR CATCHING RIVET HEADS

Marcus E. Barnes, South Holland, Ill.

Application December 14, 1956, Serial No. 628,402

2 Claims. (Cl. 220—1)

This invention relates to a device for catching flying rivet heads or the like as they are severed by a cutting tool.

An object of the invention is to provide a portable container which is adapted to catch flying rivet heads or the like and dissipate their force, thus preventing possible injuries to individuals in the vicinity or damage to equipment.

A more specific object is to provide a portable container which is adapted to overlie a row of rivets and has a mouth adapted to receive a rapidly moving severed rivet head traveling in an erratic path and a cylindrical portion adapted to dissipate the force of this head.

Figure 1:
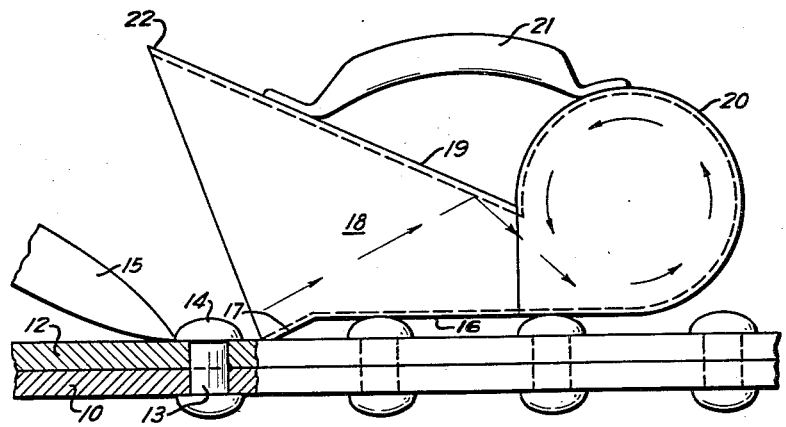
Figure 2:
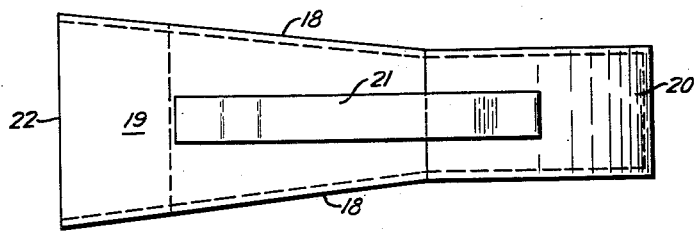

In accomplishing these and other objects of the invention, I have provided improved details of structure, a preferred form of which is shown in the accompanying drawing, in which:

Figure 1 is a side elevational view of a catching device constructed in accordance with my invention; and Figure 2 is a top plan view of the device.

Figure 1 shows a pair of plates 10 and 12 and a row of rivets 13 joining said plates. The rivets have heads 14 which can be severed with any conventional chisel-like cutting tool 15. As the rivet heads are severed, they tend to fly erratically and with considerable force and desirably are caught to prevent injuries or damage.

The catching device of my invention is in the form of a portable container which has a flat bottom wall portion 16, a downwardly inclined bottom wall portion 17, side walls 18, and a top wall 19 diverging from said bottom wall portions. Preferably the side walls 18 also diverge outwardly as shown in Figure 2. The container also has a cylindrical portion 20, the bottom wall portion 16 being in a plane tangential to the bottom edge of the curved wall of this cylindrical portion. The top wall 19 is relatively close to the bottom wall portion at their juncture with the cylindrical portion to form a restricted entrance throat to the latter. Preferably a handle 21 extends across the container between the top wall 19 and the cylindrical portion 20. As shown in Figure 1, the top wall extends farther than the bottom wall to provide an overhang 22.

In operation, the container is positioned over a row of rivet heads 14 as shown in Figure 1. The flat bottom wall portion 16 rests on these heads, while the inclined bottom wall extends downwardly into contact with plate 12 adjacent the rivet whose head is to be cut on the opposite side from the cutting tool 15. The overhang 22 fully overlies this rivet. When the head is severed, it flies into the mouth of the container. The inclined bottom wall portion 17 and the overhang 22 assure that the head enters the container even though its path may be quite erratic. Normally the head flies somewhat upwardly until it strikes the top wall 19, which deflects it downwardly through the throat into the cylindrical portion 20, where it curves upwardly and assumes a circular course to dissipate its force. The arrows in Figure 1 indicate the normal path of a rivet head within the container. The head can be dumped readily from the container after it is caught as described.

From the foregoing description, it is seen that my invention affords a simple, safe device for catching flying rivet heads. An important feature is that the wall of the cylindrical portion 20 curves upwardly from the bottom wall 16 so that the bottom wall is free of downward protuberances that would prevent the device from being positioned as shown in Figure 1. Although illustrated for use on horizontal plates, it may be used with equal advantage on vertical or inclined plates. It may also be used for catching articles other than rivet heads where similar safety problems are encountered.

While I have shown and described only a single embodiment of my invention, it is apparent that modifications may arise. Therefore I do not wish to be limited to the disclosure set forth but only by the scope of the appended claims.

I claim:

1. A device for catching flying rivet heads or the like comprising a portable container having a cylindrical portion, a flat bottom wall portion extending tangentially from said cylindrical portion, a downwardly inclined bottom wall portion extending from the end of said flat bottom wall portion remote from said cylindrical portion, a top wall extending from said cylindrical portion in spaced relation from said bottom wall portions and diverging therefrom in a direction away from said cylindrical portion, and side walls joined to said bottom wall portion and said top wall, there being a narrow entrance throat to said cylindrical portion between said flat bottom wall portion and said top wall, said top wall extending outwardly of said bottom wall portion to provide an overhang, said flat bottom wall portion being adapted to rest on a row of rivet heads, said inclined bottom wall portion to contact a surface from which the rivet heads project, and said overhang to overlie the rivet whose head is being severed.

2. A device as defined in claim 1 in which said side walls diverge outwardly from each other and including a handle connected between said top wall and said cylindrical portion.

References Cited in the file of this patent

UNITED STATES PATENTS

| 232,361 | Neville | Sept. 21, 1880 |
| 718,783 | McIntire | Jan. 20, 1903 |
| 1,327,917 | Kellar | Jan. 13, 1920 |
| 1,645,806 | Fries | Oct. 18, 1927 |

FOREIGN PATENTS

| 381,338 | Great Britain | Oct. 6, 1932 |